*INVENTOR.*
JOHN M. PETERSON
BY
Knox & Knox

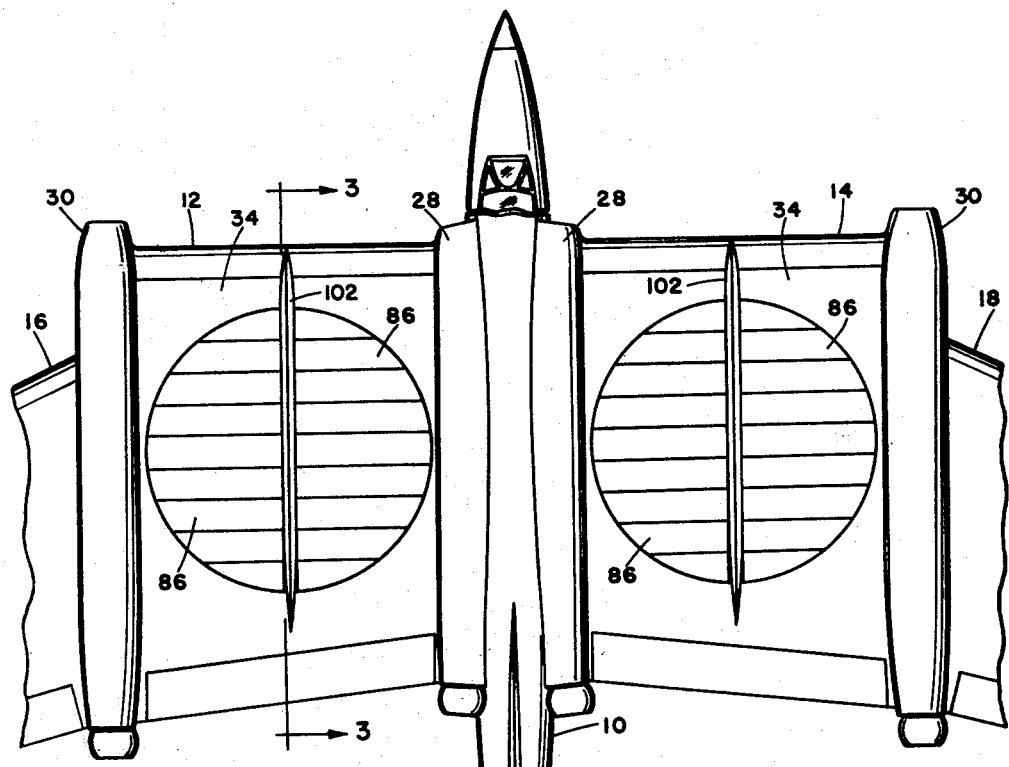
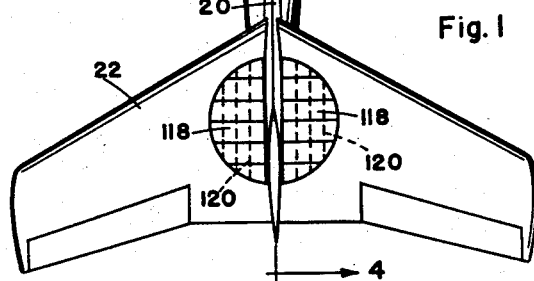
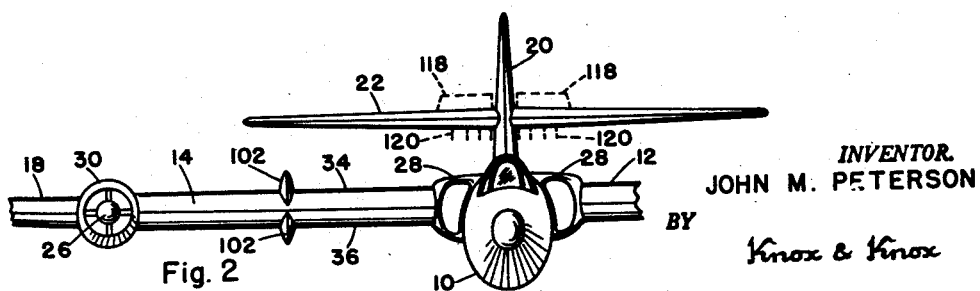

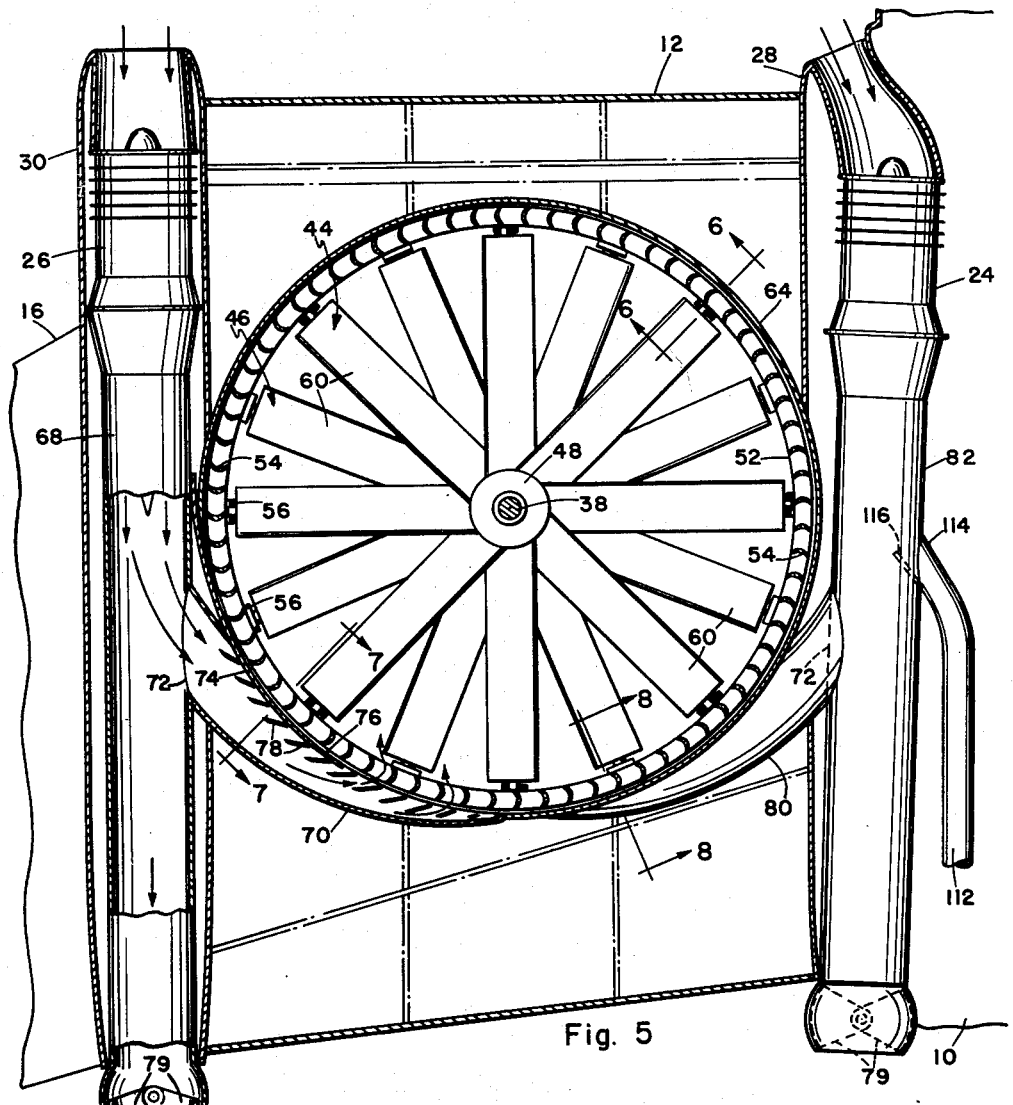
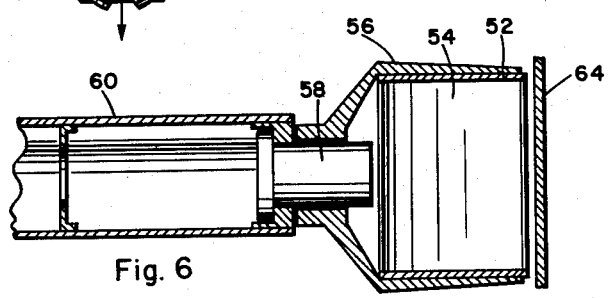
Fig. 5
Fig. 6
INVENTOR.
JOHN M. PETERSON
BY
Knox & Knox

INVENTOR.
JOHN M. PETERSON
BY
Knox & Knox

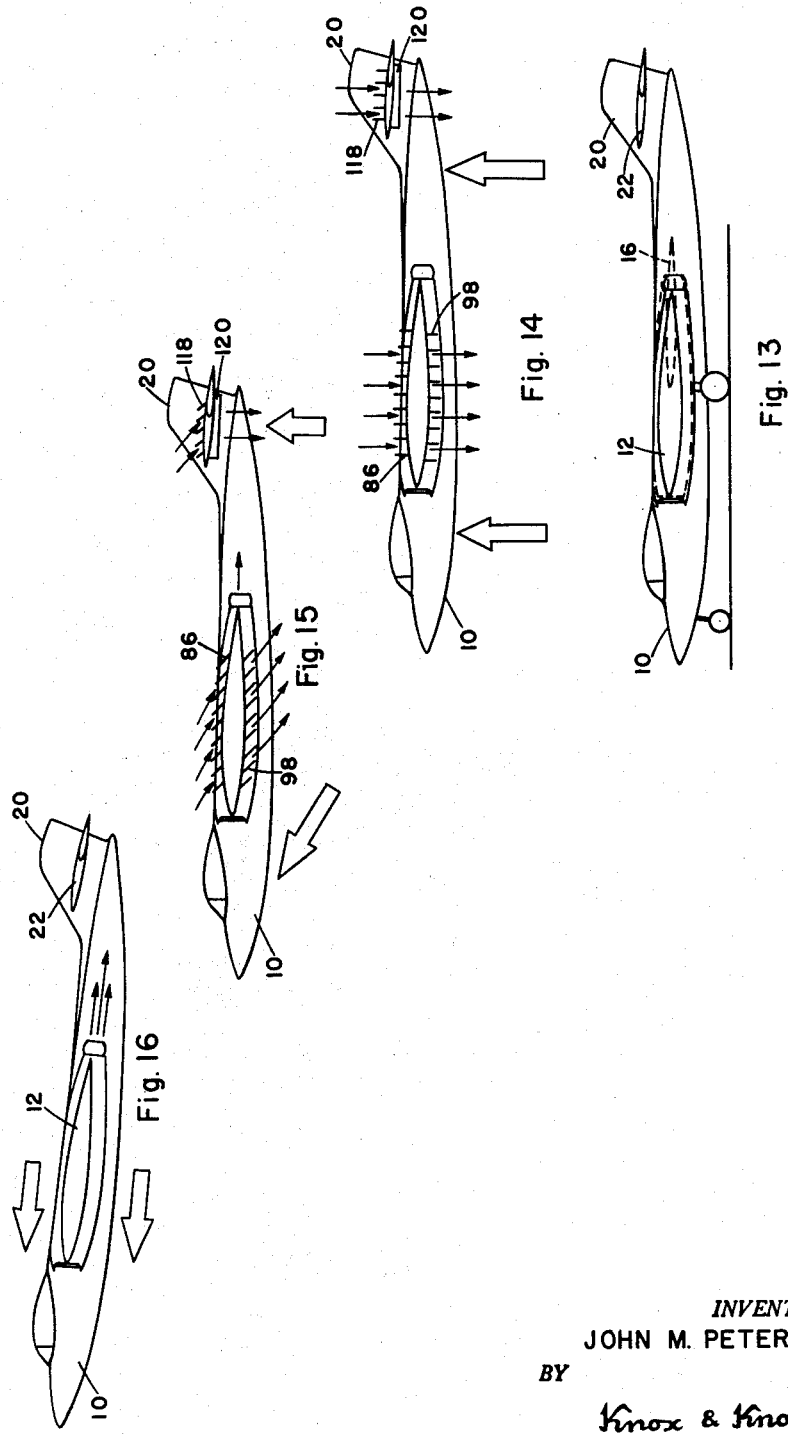

United States Patent Office 3,179,353
Patented Apr. 20, 1965

3,179,353
JET POWERED DUCTED FAN CONVERTIPLANE
John M. Peterson, San Diego, Calif., assignor to Ryan
Aeronautical Co., San Diego, Calif.
Filed Feb. 4, 1958, Ser. No. 713,232
2 Claims. (Cl. 244—12)

The present invention relates generally to aircraft and more particularly to a jet powered ducted fan convertiplane.

Existing types of jet aircraft require long take-off and landing runs which limit their operation to large airfields. Vertical take-off by jet aircraft has recently been achieved by diverting the jet exhaust downwardly for direct vertical lift, but this necessitates a powerful engine or engines having a static thrust greater than the weight of the aircraft, so that the structure design and payload of the aircraft are seriously limited.

Thrust developed by an aircraft engine, regardless of type, is a function of mass air flow times velocity, whereas the power required to produce a given thrust is a function of mass air flow times velocity squared. Thus a large air mass moving at low velocity produces a given amount of thrust with less power than a small mass of air moving at high velocity, which is illustrated by a helicopter of comparatively low power lifting a payload which would necessitate a much more powerful jet engine using pure jet thrust. The ideal aircraft, therefore, combines the vertical lift efficiency of a helicopter with the high speed level flight of a jet aircraft. Since the conventional helicopter rotor is a clumsy affair, an enclosed impeller such as a ducted fan is desirable and is especially efficient. To avoid the use of a separate power unit with its attendant complex gearing and drive mechanism to power the ducted fan, the present invention utilizes the jet exhaust diverted from the conventional jet engine to drive the fan through a suitable turbine surrounding the fan at its periphery, and it has been found that such a fan will develop a lifting thrust equal to several times the normal effective thrust of the jet engine itself due to the increased mass flow. Furthermore, the herein disclosed structure is sufficiently compact for easy installation in a thin wing. Provision is also made for smooth transition from vertical to horizontal flight and back again to vertical flight without loss of lift or control and without any tendency of the aircraft to stall. In addition, it is proposed to eliminate the critical center of gravity condition which exists in the usual vertical take-off aircraft and provide an aircraft having a useful range of loading possibilities. The aircraft is also capable of short run take-off and landing or STOL performance in addition to its vertical take-off and landing or VTOL characteristics.

The primary object of this invention is, therefore, to provide an aircraft having conventional jet engines for high speed forward flight and a ducted fan installation for vertical flight, the fan being driven by the jet engines during vertical flight.

Another object of this invention is to provide a ducted fan aircraft in which the fan installation is sufficiently compact to be installed in a thin wing of a jet aircraft.

Another object of this invention is to provide a ducted fan aircraft having means for deflecting the thrust of the fan for control in vertical flight and for initiating the transition to and from forward flight in such a way that the entire transition from fan thrust to jet thrust is smooth and easily controlled.

Yet another object of this invention is to provide an aircraft in which the ducted fan is a freely rotating unit having no direct or mechanical drive connections, but being driven entirely by the jet engine exhaust acting on a turbine mounted integrally with the fan.

A further object of this invention is to provide a ducted fan aircraft which is particularly stable in vertical flight.

Another object of this invention is to provide a jet engine-ducted fan combination which is adaptable to many types of aircraft of varied performance characteristics.

Another object of this invention is to provide a ducted fan aircraft which is capable of full vertical take-off or, when heavily loaded, is equally adaptable for short run take-off with both forward and vertical thrust.

Yet another object, somewhat negative in character, is to accomplish all the foregoing objects without recourse to gear boxes and the like which require excessive maintenance and are a source of unnecessary weight, and without recourse to vanes in the slip-stream when the craft is in high speed forward flight.

Finally, it is an object to provide an aircraft of the aforementioned character which is simple, safe and convenient to operate and which will give efficient and durable service within the limits of its designed capabilities.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a partial top plan view of an aircraft incorporating the ducted fan installation;

FIGURE 2 is a partial front elevation view of the aircraft;

FIGURE 5 is an enlarged fragmentary sectional view taken on the line 5—5 of FIGURE 3;

FIGURE 6 is an enlarged fragmentary sectional view taken on the line 6—6 of FIGURE 5;

FIGURES 13, 14, 15, and 16 are diagrammatic side elevation views of the aircraft in four stages from rest to vertical take-off, through transition, to forward flight.

Similar characters of reference indicate similar or identical elements and portions throughout the specification and throughout the views of the drawings.

Figure 3:
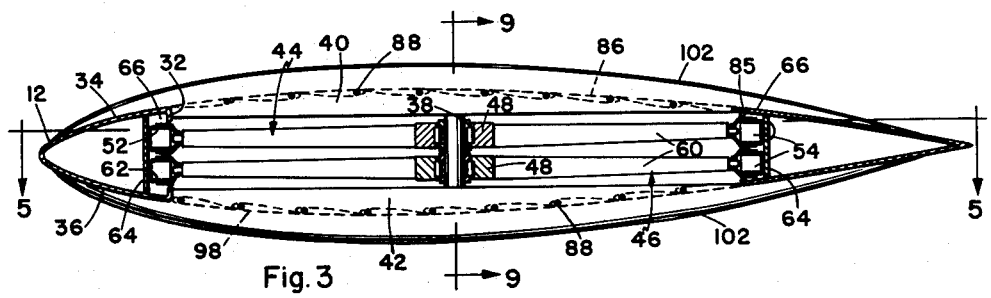
FIGURE 3 is an enlarged sectional view through the wing taken on the line 3—3 of FIGURE 1.

The drawings illustrate a specific type of aircraft suitable for attack duties and utilizing four jet engines and two main ducted fan units. It should be understood, however, that the jet engine-ducted fan combination is applicable to many types of aircraft such as transports, fighters, observation and special purpose types, the present configuration being shown merely to illustrate one practical embodiment of the invention, the scope of the invention being limited only by the appended claims.

The aircraft is basically conventional and has a fuselage 10, inner wing panels 12 and 14, outer wing panels 16 and 18, a fin 20 and tailplane 22. The aircraft is powered by four jet engines, the inboard engines 24 being mounted on either side of the fuselage 10 and the outboard engines 26 being at the outer ends of the inner wings 12 and 14, the engines being enclosed in suitable nacelles 28 and 30 respectively. Since the fan and engine installations are identical, although reversed, in the wing panels 12 and 14, the structure will be described for the port wing panel 12 only, the one shown in detail.

The wing panel 12 has a large circular duct 32 extending completely through the wing from the upper surface 34 to the lower surface 36. Mounted axially in the duct 32 is a fixed shaft 38, the ends of which are supported in structural beams 40 and 42 extending across the duct, cordwise of the wing panel 12, at the upper and lower surfaces 34 and 36 respectively. Mounted for free rotation on the shaft 38 are two counter-rotating, multi-bladed fans 44 and 46, each having a central hub 48 containing a suitable bearing 50. Fixed to the periphery of the upper fan 44 and concentric therewith is a turbine ring 52 having a plurality of individual turbine blades 54, extending generally in the plane of the fan 44, said turbine ring being held by a plurality of saddle members 56, each of which is radially slidable on a stub 58 extending from the tip of each individual fan blade 60, as shown in FIGURE 6. Thus the turbine ring 52 is fixed to rotate with the fan 44 yet is adapted to permit a limited radial expansion resulting from heating in operation. A further turbine ring 62 is secured in a similar manner to the lower fan 46 for rotation in the opposite direction. The turbine rings 52 and 62 extend through the duct 32 and are entirely outside the duct proper, the fans being enclosed by a shroud ring 64, which is slightly larger than the duct and is concentric therewith to define an annular chamber 66 in which the turbine rings rotate.

The outboard engine 26 has a tailpipe 68 to which is connected an inwardly extending conduit hereafter referred to as the scroll 70 having an inlet 72. The scroll 70 extends through the shroud ring 64 over a portion of its circumference to communicate with the annular chamber 66, said scroll having a narrow slot-like outlet 76, substantially equal in area to the area of the inlet 72, which is aligned with the blades 54 of the upper turbine rings 52 as in FIGURES 5 and 7, and is effectively closed by a slide valve 74. The outlet 76 has therein a plurality of angularly disposed flow-directing or stator blades 78 of suitable design to guide the flow of gases. These blades 78 lie in the plane of the turbine blades 54. To ensure efficient operation of the engine, it is important that the total exhaust gas exit area is constant. Therefore, as the inlet 72 is exposed by moving the slide valve 74, the tailpipe 68 must be closed a corresponding amount and this may be accomplished by means of a pair of hinged eyelid type baffles 79 suitably mounted on the tailpipe, as in FIGURE 5, which shows the slide valve partially opened and the baffles partially closed. Other types of baffles or closure devices may be utilized according to the particular installation and the controls for the baffles 79, or their equivalent, are interrelated to the controls for the slide valve 74, so that the total area is constant.

The inboard engine 24 is arranged in a similar manner and has a scroll 80 extending from the tailpipe 82 to the annulus 66, but the outlet 84 of said scroll is aligned with the lower turbine ring 62 and is provided with further stator blades 78 to direct gases to said lower turbine ring. The inlet of the scroll 80 is also fitted with a slide valve 74 and the tailpipe 82 has further baffles 79.

Figures 7, 8, 9:
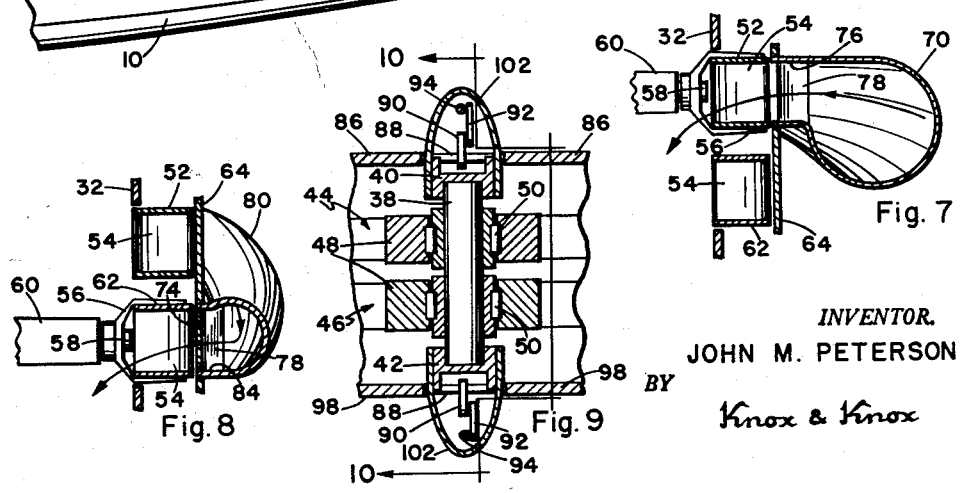
FIGURE 7 is an enlarged fragmentary sectional view taken on the line 7—7 of FIGURE 5.
FIGURE 8 is an enlarged fragmentary sectional view taken on the line 8—8 of FIGURE 5.
FIGURE 9 is an enlarged fragmentary sectional view taken on the line 9—9 of FIGURE 3.
Figure 10:
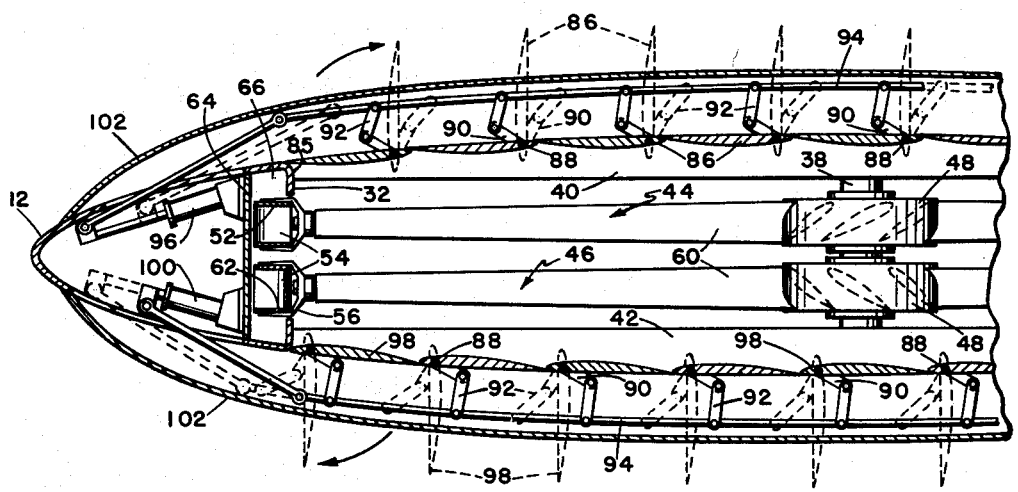
FIGURE 10 is a fragmentary sectional view taken on the line 10—10 of FIGURE 9.

The upper opening of the duct 32 has a curved inlet lip 85 with a suitable radius and is covered by a plurality of parallel vanes 86 running spanwise of the wing panel 12 and being divided on each side of the beam 40, said vanes being connected in pairs by means of connecting rods 88 across said beam, as shown in FIGURE 9. The vanes 86 are hinged adjacent their trailing edges on the connecting rods 88 and, when closed, said vanes overlap slightly so that the upper surface of the wing is as smooth as possible. The specific cross sectional shape of the vanes 86 is not critical and may vary considerably from that shown according to the aerodynamic requirements. Extending outwardly from each connecting rod 88 is a fixed lever 90, the end of which is pivotally connected to a link 92, the other end of said link being pivotally connected to an actuating rod 94 which is suubstantially parallel to the beam 40 and interconnects all the vanes 86, as shown in FIGURES 9 and 10. The forward end of the actuating rod 94 is connected to a jack 96 mounted in the leading edge of the wing panel 12 so that, by actuation of said jack, all the vanes 86 may be raised or lowered simultaneously.

The lower opening of the duct 32 is covered by a plurality of vanes 98 which are disposed and interconnected in the same manner as the upper vanes 86, the same reference numerals 90, 92 and 94 being used to indicate like parts, except that the lower vanes 98 are hinged at their leading edges and the lower vanes are opened and closed by a separately controlled jack 100, as in FIGURE 10. The actuating rods 94 and their associated linkage are enclosed in narrow fairings 102 fixed to the upper and lower surfaces of the wing panel 12, these fairings resembling the wing fences used on high speed aircraft for boundary layer flow control, as will be apparent from FIGURE 2. Although the vane actuating mechanism shown is external to the wing, this arrangement would be necessary only in an extremely thin wing and in many cases it would be possible to enclose all of the mechanism within the normal wing profile.

Figure 4:
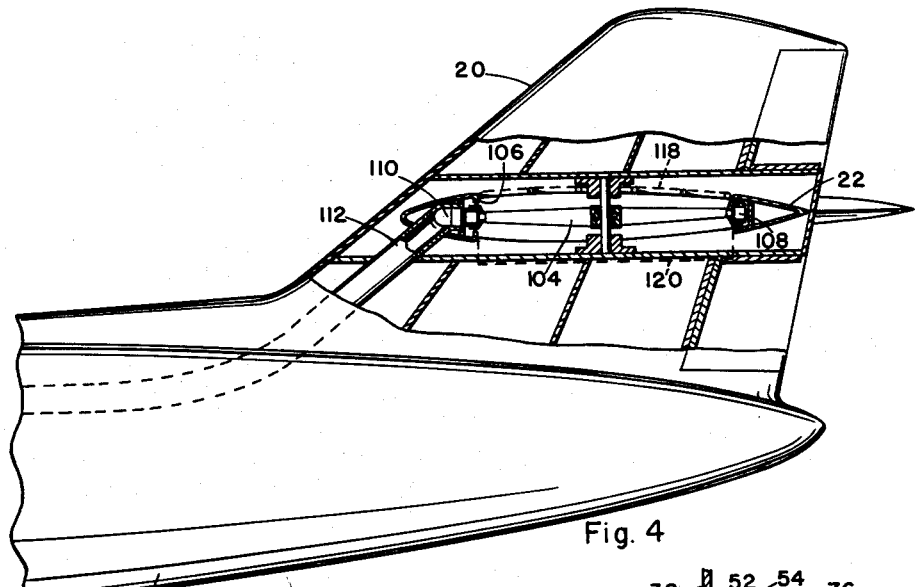
FIGURE 4 is an enlarged sectional view through the tail assembly taken on the line 4—4 of FIGURE 1, portions being shown in elevation for clarity.

In this particular aircraft, hovering lateral control is achieved by having a fan installation in each wing so that a controlled variation of lifting thrust can be obtained on either side. Hovering longitudinal and directional control is achieved by a fan installation fitted into the tail assembly. Also, to provide an allowable center of gravity travel in a hovering condition, a constant thrust, above and beyond that required for control, can be obtained from the tail fan installation. This constant thrust can be adjusted so as to maintain the aircraft in a desirable attitude regardless of where the center of gravity falls, within its allowable travel positions. In this installation, shown somewhat diagrammatically in FIGURES 1 and 4, the fan 104 is mounted in a duct 106 centrally disposed in the tailplane 22, the axis of said fan being within the fin 20. The fan 104 has a turbine ring 108 fitted to its periphery and is driven by the jet engine exhaust through a scroll 110 which is connected to the inboard engines 24 by means of a bleed pipe 112, as shown in FIGURES 4 and 5. The inlet 114 of the bleed pipe 112 at the tailpipe 82 is closed by a hinged baffle 116. The configuration of the fan 104 and its installation is similar to that described for the wing fan assembly with the exception of the lower vanes. The duct 106 is covered on the upper side with vanes 118 which are similar to those in the wing fan assembly and are arranged in laterally opposed pairs on either side of the fin 20. The lower side of the duct 106 has vanes 120 which are disposed longitudinally of the aircraft and are used for directional control simply by deflecting the air stream to either side in the proper direction. Pitch control is obtained by varying the thrust of the tail fan 104. The vanes 118 and 120 are provided with an actuating mechanism similar to that described above for the vanes 86 and 98 and the mechanism may be entirely enclosed within the fin 20 and the tailplane 22.

Referring now to FIGURES 13–16, the engines are started with the aircraft in normal static position, as in FIGURE 13. When ready for take-off, the vanes 86 and 98 on both wings and the vanes 118 and 120 on the tailplane are opened fully to expose the ducts 32 and 106. The slide valves 74 are then opened and the baffles 79 are actuated to close off the tailpipes 68 and 82 so that the jet exhaust gases are diverted into the scrolls 70 and 80, through the stator blades 78 and against the turbine blades 54. The gas flow is substantially tangential to the turbine axes and is spread over a considerable number of individual blades 54 to produce a maximum power transfer. The fans 44 and 46 are thus rotated rapidly and create a downward stream of air through the ducts 32 to lift the aircraft, as in FIGURE 14. The exhaust gases pass through the turbine rings 52 and 62 into the ducts 32 and are carried downwardly with the slipstream of the fans, as in FIGURES 7 and 8. Although the gases, after passing between the turbine blades 54, enter the duct substantially radially, as indicated in FIGURE 5, their velocity is relatively very low since their force has been expended against the turbine blades, thus the gases do not interfere unduly with the air flow through the ducts. Simultaneously with the slide valves 74, the baffle 116 is opened so that a portion of the exhaust gases is carried to the tail fan assembly to drive the fan 104 and provide downward thrust at the tail. By adjusting the baffle 116, the speed of rotation of the fan 104 can be controlled, affording an effective lift and pitching control of the aircraft. By movement of vanes 120, the slipstream of fan 104 can be directed to afford an effective directional control. By controlling the speed of the engines 24 and 26, and their counterparts on the opposite side of the aircraft, the total thrust and speed of ascent are readily controlled and, an effective roll control is achieved. It should be understood that the actuating mechanisms for the slide valves 74 and baffles 116 are connected to conventional pilot operated controls in such a manner that operation of the aircraft is simple and instinctive, the specific devices involved not being a critical part of this disclosure. Similarly, the control system for the vanes 86 and 98 and vanes 118 and 120 may be of any suitable type well known in the art.

Figure 11:
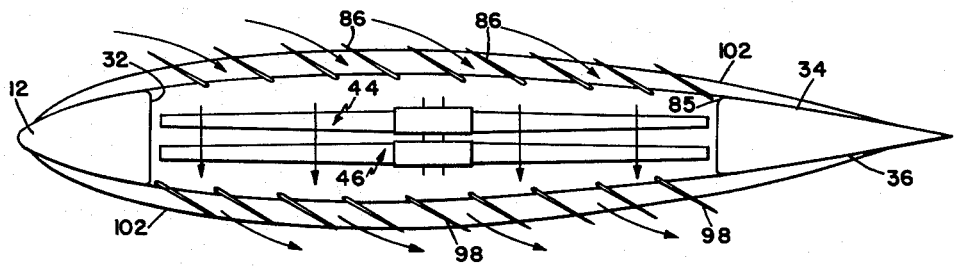
FIGURE 11 is a diagrammatic sectional view similar to FIGURE 3, showing the fan deflector vanes in the forward transition position.

When sufficient altitude has been reached in vertical ascent, the vanes 98 are tilted rearwardly as in FIGURES 11 and 15, so that the fan thrust is directed to the rear causing the aircraft to be propelled forwardly. As the forward speed of the aircraft increases to the point where the wings are contributing to the lift, and the aircraft is safely beyond the stalling speed, the slide valves 74 and baffles 116 are completely closed and the baffles 79 are opened so that all the engine thrust is to the rear, and all the vanes 86, 98, 118 and 120 are closed to present smooth wing and tail surfaces, as in FIGURE 16. In this condition, the aircraft is capable of high speed flight with the performance of a conventional jet aircraft.

Figure 12:
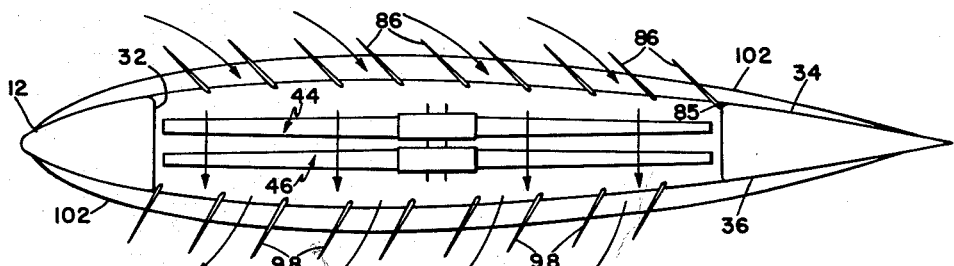
FIGURE 12 is a view similar to FIGURE 11, but with the vanes in braking or reverse thrust position.

For landing, the aircraft is decelerated to a reasonable speed and the vanes 86 and 98 are opened to the position shown in FIGURE 12, with both the upper and lower vanes tilted forwardly. The slide valves 74 are then opened to drive the fans and their slipstream is directed forwardly to arrest the forward motion of the aircraft. When the forward speed is reduced, the tail fan 104 can be used for stabilization of the aircraft during vertical descent.

The fan system described herein is applicable to many types of aircraft, and either single or multiple fan assemblies may be used, with one fan or counter-rotating fans in each assembly as required. In a tailless or flying wing aircraft, for example, a single counter-rotating fan assembly may be placed centrally in the wing and small stabilizing fans placed near the wing tips adjacent the trailing edge for lateral and longitudinal control. Other configurations will be readily apparent to those skilled in the art. In addition to its vertical take-off and landing characteristics, the present fan system is also applicable to short run take-off and landing, such as in large aircraft which may be too heavily loaded to be lifted directly vertically. Further, the installation does not interfere with the use of afterburners which may be installed at the rear of the tail pipes.

Various types of impellers or fans driven by means of a turbine either directly or indirectly coupled, have been proposed in the past, but these are usually devices in which the gas flow is in an axial direction relative to the fan. This type of installation is extremely bulky in an axial direction and is not suitable for thin wing structures. The structure herein described utilizes gas conducting scrolls which contain and distribute the gases over a large portion of the turbine in their natural direction of flow, with a minimum of expansion and velocity losses. By using the tangential flow type turbine and the scroll structure shown, the entire fan installation may be kept virtually within the dimensions of the axial thickness of the fans themselves and is consequently ideally suited for fitting into a thin wing.

It should be understood that all structural and mechanical components and the materials used conform to accepted aircraft standards, the structure shown being merely illustrative.

I claim:

1. In an aircraft having a wing: a generally circular duct extending vertically through said wing; a pair of counter-rotating, multi-bladed fans mounted for free rotation axially in said duct; a turbine ring fixed to the periphery of each of said fans and concentric therewith; a pair of jet engines operatively mounted in the aircraft and having tailpipes disposed longitudinally for normal rearward thrust; a first scroll having an inlet leading from one of said tailpipes and extending substantially tangentially to one of said turbine rings, said first scroll having an elongated outlet extending around a portion of the outer circumference of said one turbine ring; a second scroll having an inlet leading from the other of said tailpipes and extending in a direction opposite to that of the first scroll; said second scroll having an elongated outlet extending around a portion of the outer circumference of the other of said turbine rings; baffle means in said tailpipes to divert exhaust gases therefrom into the respective scrolls, and guide means in said outlets to direct the gases to the respective turbine rings; and means for controlling the flow of air through said duct.

2. In an aircraft having a wing: a generally circular duct extending vertically through said wing; a multi-bladed fan mounted for free rotation axially in said duct; a turbine operatively connected to said fan; a jet engine operatively mounted in the aircraft and having a tailpipe disposed longitudinally in the aircraft for normal rearward thrust; a scroll having an inlet at said tailpipe and an outlet adjacent said turbine, said outlet extending circumferentially around a portion of said turbine and being shaped to direct exhaust gases substantially tangentially to the turbine; and baffle means in said tailpipe to divert at least a portion of the engine exhaust gases into said inlet; a plurality of vanes adjustably mounted at the upper and lower ends of said duct, said vanes completely enclosing said duct and being co-extensive with the wing surfaces when in closed position; and means for opening said vanes to selected angular positions to control the air flow through said duct; a further, smaller duct extending vertically through a portion of the aircraft longitudinally offset from said first mentioned duct; a stabilizing fan freely rotatably mounted axially in said smaller duct; a turbine ring peripherally fixed to said stabilizing fan and concentric therewith; and means for conducting a portion of the gases from said tailpipe to said last mentioned turbine ring; a plurality of vanes pivotally mounted at the upper and lower ends of said smaller duct, and means for opening said last mentioned vanes to selected angular positions, the upper vanes in said smaller duct being pivoted on axes extending substantially transversely of the aircraft, and the lower vanes in said smaller duct being pivoted on axes substantially parallel to the longitudinal axis of the aircraft and constitute directional control means.

References Cited by the Examiner

UNITED STATES PATENTS

| | | | |
|---|---|---|---|
| 1,783,458 | 12/30 | Windsor | 244—6 |
| 1,809,271 | 6/31 | Goddard | 244—15 |
| 1,824,195 | 9/31 | Chillingworth | 170—135.7 |
| 2,325,221 | 7/43 | Bretzlaff et al. | 170—168 |
| 2,442,169 | 5/48 | Hart | 170—135.7 |
| 2,650,666 | 9/53 | Dorand et al. | 170—135.7 X |
| 2,774,554 | 12/56 | Ashwood | 244—23 |
| 2,835,332 | 5/58 | Fry | 170—135.7 X |
| 2,863,621 | 12/58 | Davis | 244—23 |
| 2,884,633 | 4/59 | Stahmer | 244—12 |
| 2,899,149 | 8/59 | Breguet | 244—12 |
| 2,940,689 | 6/60 | Howell | 244—12 |
| 3,087,691 | 4/63 | Rainbow | 244—52 X |

FOREIGN PATENTS 1,029,081  3/53  France.
  67,737  10/57  France.
    (1 RE Addition to 1,068,404)
 744,107  2/56  Great Britain.

FERGUS S. MIDDLETON, *Primary Examiner.*

EMILE PAUL, MILTON L. MARLAND, MILTON BUCHLER, R. DAVID BLAKESLEE, *Examiners.*